United States Patent [19]

Berg

[11] 4,184,807
[45] Jan. 22, 1980

[54] REVERSIBLE HYDRAULIC ENGINE

[76] Inventor: George W. Berg, 2221 Northfield Rd., Nanaimo, B.C., Canada, V9S 3C3

[21] Appl. No.: 923,251

[22] Filed: Jul. 10, 1978

[51] Int. Cl.² ............................................. F04B 17/00
[52] U.S. Cl. ................................... 417/334; 417/337; 415/5; 405/75; 60/398
[58] Field of Search ................. 415/2, 5, 6, 7; 417/61, 417/331, 333, 334, 337, 436; 405/75, 76; 60/398, 504

[56] References Cited

U.S. PATENT DOCUMENTS

| | | | |
|---|---|---|---|
| 37,168 | 12/1862 | Hunsicke | 415/5 |
| 471,564 | 3/1892 | Neal | 415/5 |
| 485,412 | 11/1892 | Johnson | 415/5 |
| 635,208 | 10/1899 | Turner | 415/5 |
| 697,317 | 4/1902 | Brian | 415/6 X |
| 1,131,680 | 3/1915 | Cooke | 415/5 |

*Primary Examiner*—Edgar W. Geoghegan
*Attorney, Agent, or Firm*—Howard I. Podell

[57] ABSTRACT

A hydraulic engine for transforming the energy of a flowing current of water into a pressure head of water. The engine is mounted on a platform supported by floats and fitted with a series of paddles linked by drive chains which pass about a pair of drive wheels such that flow of water over the platform causes the paddles to move in the direction of flow to rotate the drive wheels with the paddles and chain being elevated above the water level for return travel. A drive wheel is joined by a shaft to a cam wheel against which an end of a piston shaft is engaged so that rotation of the cam wheel causes reciprocal travel of the piston shaft with the piston enclosed in a cylinder that pumps water up through a vertical pipe to create a pressure head of water for driving a generator engine. The cam wheel is shaped so that the reciprocal travel of the piston may be varied depending upon the radial position of the piston shaft. A telescopic hydraulic unit supports the cylinder on the platform so that radial position of the piston shaft may be varied to suit the condition of water flow.

5 Claims, 7 Drawing Figures

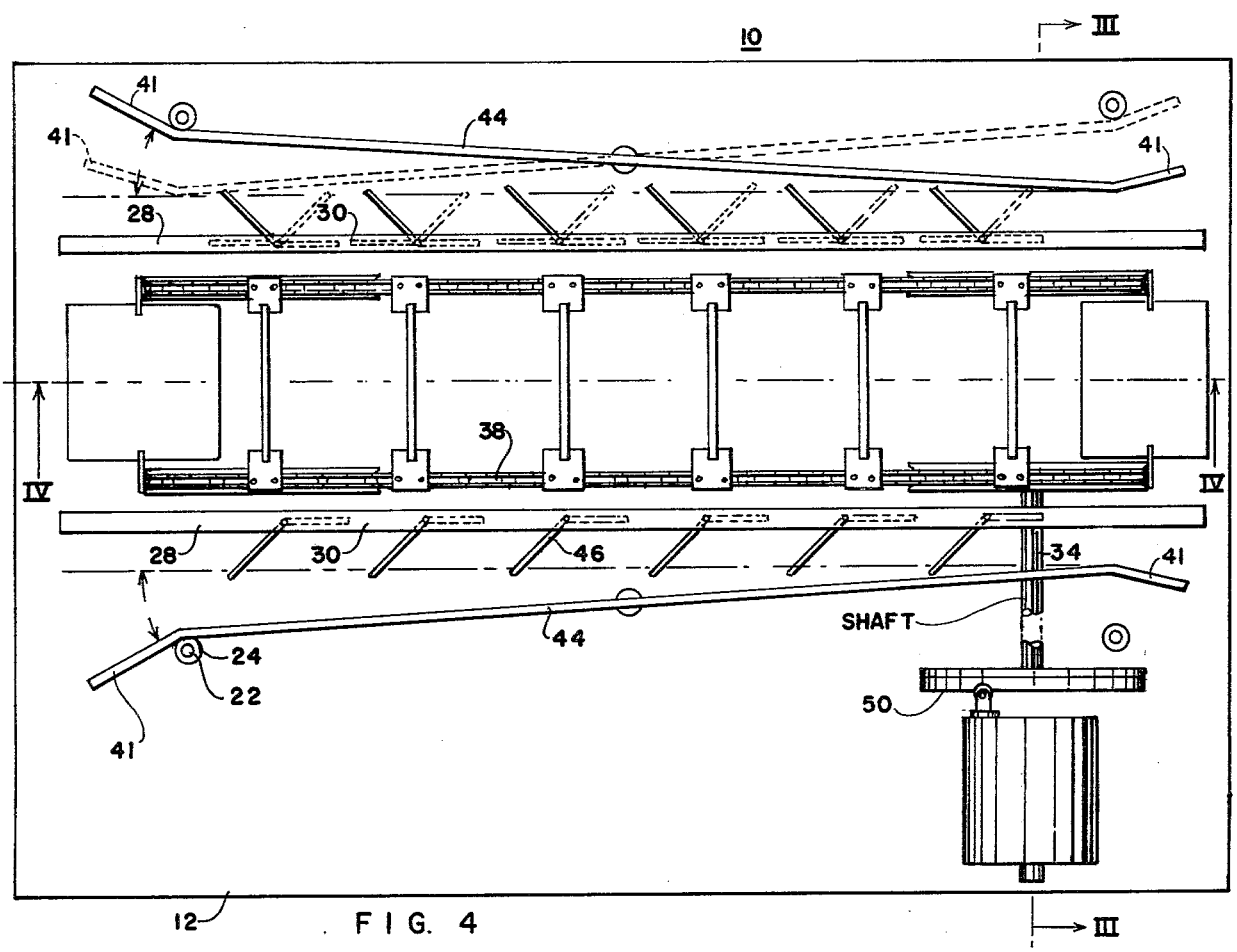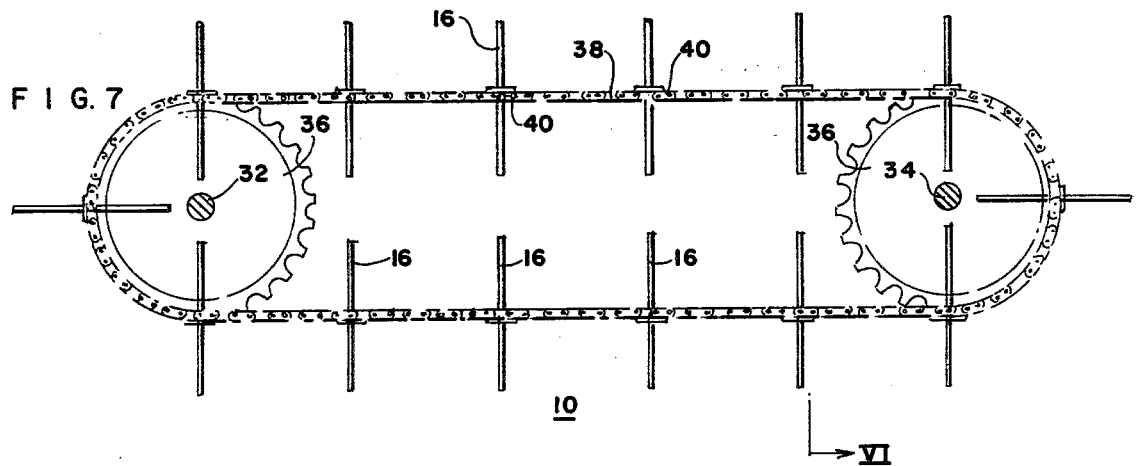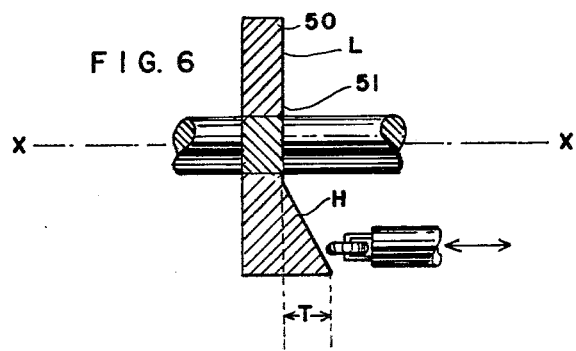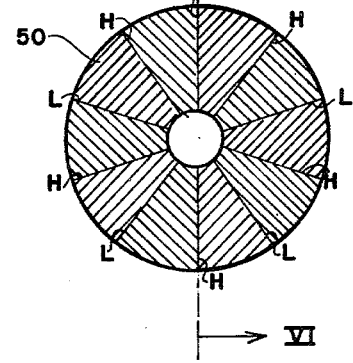

REVERSIBLE HYDRAULIC ENGINE

PRIOR ART

Water engines involving the use of paddles are disclosed by U.S. Pat. Nos. 37,168; 697,317; 485,412; 1,131,680; 635,208; 471,564. However, these inventions do not disclose the novel features of this application.

SUMMARY OF THE INVENTION

My invention is a hydraulic engine for transforming the energy of a flowing current of water into a pressure head of water. The engine is mounted on a platform supported by floats and fitted with a series of paddles linked by drive chains which pass about a pair of drive wheels such that flow of water over the platform causes the paddles to move in the direction of flow to rotate the drive wheels with the paddles and chain being elevated above the water level for return travel. A drive wheel is joined by a shaft to a cam wheel against which an end of a piston shaft is engaged so that rotation of the cam wheel causes reciprocal travel of the piston shaft with the piston enclosed in a cylinder that pumps water up through a vertical pipe to create a pressure head of water for driving a generator engine. The cam wheel is shaped so that the reciprocal travel of the piston may be varied depending upon the radial position of the piston shaft. A telescopic hydraulic unit supports the cylinder on the platform so that radial position of the piston shaft may be varied to suit the condition of water flow.

BRIEF DESCRIPTION OF THE DRAWINGS

The objects and features of the invention may be understood with reference to the following detailed description of an illustrative embodiment of the invention, taken together with the accompanying drawings in which:

FIG. 4 is a plan view of the invention;
FIG. 5 is a front view of the cam wheel;
FIG. 6 is a sectional view of the cam wheel taken along line VI—VI of FIG. 5;
and
FIG. 7 is a side sectional view of the invention taken along line IV—IV of FIG. 4.

DESCRIPTION OF THE PREFERRED EMBODIMENT

Figure 1:
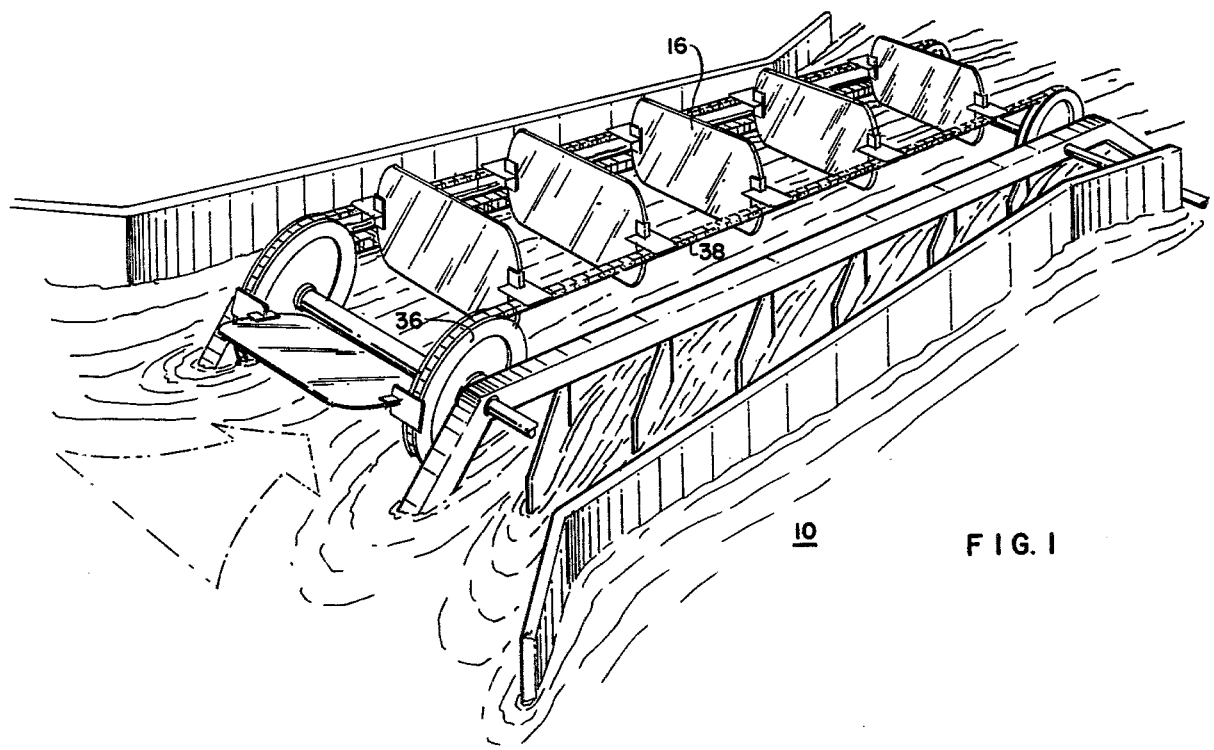
FIG. 1 is a perspective view of the invention in use.

Turning now descriptively to the drawings, in which similar reference characters denote similar elements throughout the several views, FIGS. 1, 2, 4 and 7 illustrate the engine 10 which is mounted on a base platform 12 supported by tubular floats 14 so that the lower row of paddles 16 are immersed below the level 18 of water flowing as a current with platform 12 stabilized in place by vertical poles 22 anchored to the bed of the water course with each pole 22 passing freely through a hole 24 in platform 12.

A frame 28 formed of two shaped spaced members 30 is fixed at each end to platform 12, with a pair of spaced parallel axles 32, 34 rotatably mounted in bearings to frame 28, and with a pair of spaced sprockets 36 mounted on each axle. A pair of link chain closed loops 38 are mounted about the sprockets 36 with paddles 16 mounted to the chain links 40 between the chains so that the plane of each paddle is maintained perpendicular to the direction of travel of the chain.

Deflector panels 44 are pivotally mounted externally of each chain loop to the platform in the vertical plane to direct flowing water through the middle paddle section of the device, with vertical louvers 46 pivotally mounted on the frame members and set at an angle away from the middle paddle section so as to direct flowing water from the sides of the unit towards the middle paddle section so that water flowing between a panel 44 and an adjacent frame member is directed by the louvers toward the paddles, to increase the force of the water on the immersed paddles.

Floats maintain the device, in water with the water level at or just below the height of axles 32, 34 with the paddles traveling in the direction, contrary to the water flow, being transported by the chains above the water level.

Figure 3:
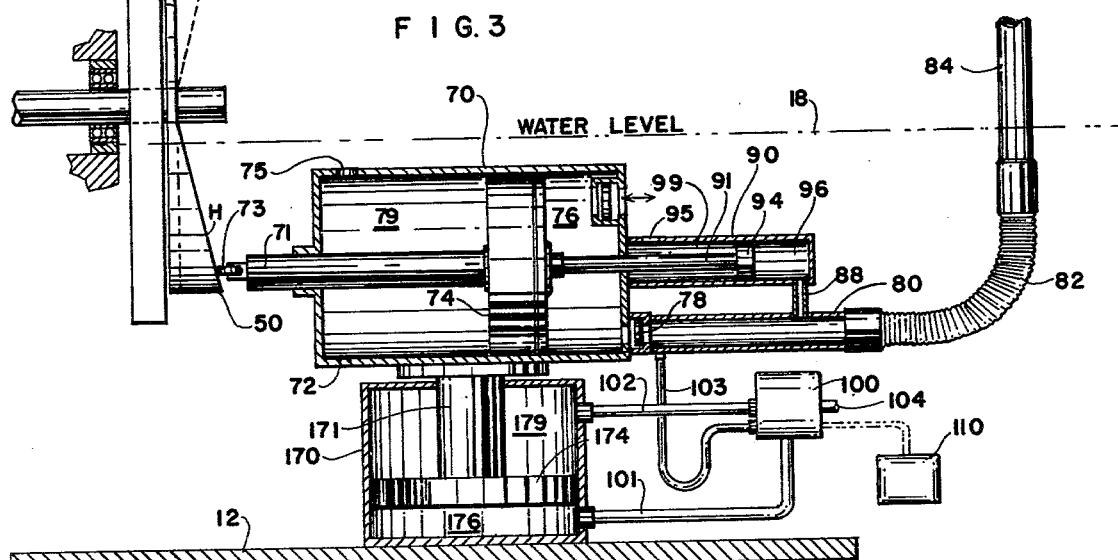
FIG. 3 is a detail end view of the invention taken along line III—III of FIG. 4.
Figure 2:
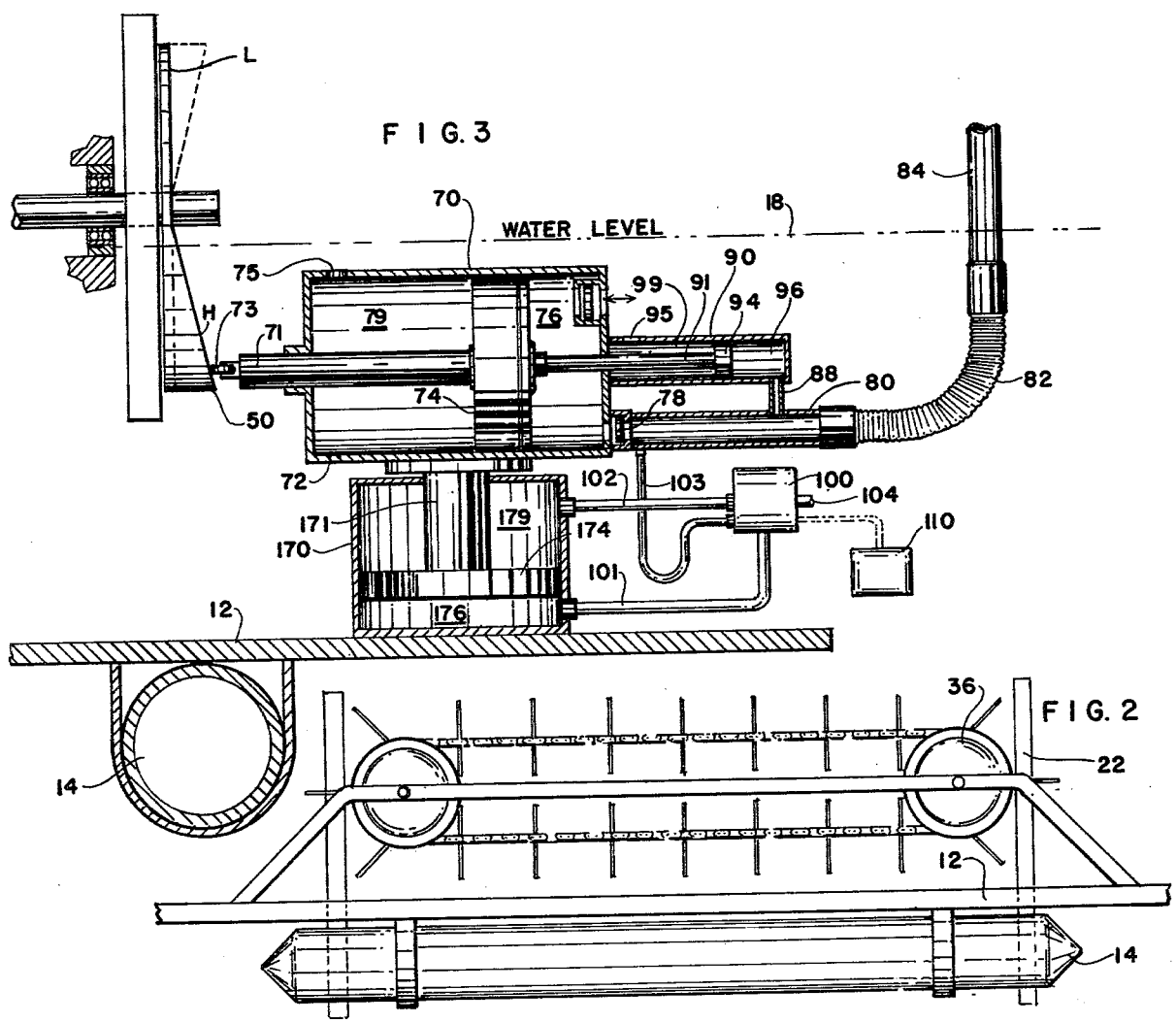
FIG. 2 is a detail side view of the invention.

A cam wheel 50 as shown in FIGS. 3, 5 and 6 is fixed externally to shaft 34 so as to rotate when the moving paddles cause shaft 34 to rotate. The external face 51 of cam wheel 50 is formed in spaced radial ridges H that increase in thickness T proportioned to distance from the center of wheel 50, with the ridges H spaced circumferentially from each other by radial valleys L that extend in a plane perpendicular to the shaft axis X—X, and with each ridge H joined by a flat inclined surface to the adjacent valleys L.

As shown in FIG. 3, a hydraulic pump unit 70 is powered by a piston shaft 71 which extends beyond the cylinder 72 with an idler wheel 73 mounted at the end of shaft 71 bearing endwise against the external cam face of wheel 50 so as to force piston shaft 71 away from wheel 50 as wheel 73 rides on the inclined surface extending from a valley L to a ridge H as wheel 50 revolves. Piston 74 travels in cylinder chamber 76 so as to force water in chamber 76 through check valve 78 into pipe 80 which is joined by a flexible tube 82 to a vertical pipe 84 that extends above the water to a generator powered by the pressure head of water in pipe 84.

An auxiliary cylinder and piston is mounted externally to cylinder 70 with auxiliary piston shaft 91 joined to main piston 74 so that water flowing through connection 88 between pipe 80 and auxiliary cylinder chamber 96 drives piston 94 and shafts 91 and 71 towards the cam surface of wheel 50 as idler wheel 73 rides from a ridge H towards a valley L on cam wheel 50.

Back cylinder chambers 79 and 99 respectively of cylinders 70 and 90 are joined by openings 75, 95 to the exterior water and forward chamber 76 of cylinder 70 is connected by a check valve 77 permitting exterior water to be drawn into forward chamber 76 when piston 74 travels towards wheel 50.

Cylinder 70 is mounted on the external end of a vertical piston shaft 171 of a hydraulic cylinder 170 with piston 174 dividing two chambers 179 and 176 each joined by a tube 101, 102 to a control valve 100 that is connected by a tube 103 to the high pressure outlet tube 80, a tube 104 to the exterior water and with valve 100 controlled by a remote device 110 so as to raise or lower piston 174 as desired by the connecting of tubes 103 and 104 to either 102 and 101 respectively or to 101 and 102 respectively or to close tubes 103 and 104.

Adjustment of the vertical height of piston 174 serves to change the radial distance of piston shaft 71 from the center of cam wheel 50 so as to adjust the distance of reciprocal travel of shaft 71, with said distance being at a maximum when shaft 71 is furthest from the center of wheel 50 since cylinder 170 is fixed to platform 12.

Such adjustment serves to compensate the travel of piston 74 with the rate of flow of water past paddles 16 and the speed of the paddles and the velocity of wheel 50.

When the hydraulic engine is used in tidal streams with alternate reverse direction of current flow, louvers 46 and deflector panels pivot to change position with the change of current flow. Such change of louver and deflector position is automatically produced by the current flow, with the current flow acting on the external vane 41 on the end of each deflector panel 44 that is bent away from the axis of the panel 44, so as to pivot the vane 41 from the current away from the mid-axis of the paddles. Louvers 46 may be linked mechanically to the deflector panels so as to pivot towards the current to force flowing water towards the paddles 16.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. An engine for producing power from the flow of water comprising, a set of paddles, means to cause rotation of a shaft when the paddles are moved by engagement of some of the paddles with a stream of flowing water, a cam wheel mounted on said shaft and engaged to a cam follower fastened to a piston of a hydraulic cylinder, said hydraulic cylinder fitted with first valve means to draw water into a cylinder chamber when the piston is moved in a first axial direction and fitted with second valve means to conduct the water in the cylinder under pressure to a vertical outlet when the piston is moved in a second axial direction;

said paddle and hydraulic cylinder mounted on a floatable frame.

2. The combination as recited in claim 2, together with hydraulic means to vary the point of contact of the cam follower to the cam wheel so as to vary the reciprocal distance of travel of the piston shaft with relation to the rotational travel distance of the cam wheel.

3. The combination as recited in claim 2, in which the cylinder is linked to the vertical outlet by a flexible tube so as to permit the cylinder to travel in a vertical direction with regard to a fixed vertical outlet.

4. The combination as recited in claim 2, in which the hydraulic means consists of a second hydraulic cylinder and piston regulated by a remotely controlled valve.

5. The combination as recited in claim 1, together with deflector panels pivotally mounted along side the paddles so as to direct flow of water towards the paddles.

* * * * *